United States Patent [19]
Misinai et al.

[11] Patent Number: 5,758,125
[45] Date of Patent: May 26, 1998

[54] METHOD OF SHARING DATA IN A HETEROGENEOUS COMPUTER SYSTEM

[75] Inventors: Tsvi Misinai, Rechovot; Michael Rothschild, Ramot Hashavim; Shmuel Alazraki, Kiriat Ono; Arie Kremer, Atereth, all of Israel

[73] Assignee: Newframe Corporation Ltd., Kiriat Ono, Israel

[21] Appl. No.: 579,721

[22] Filed: Dec. 28, 1995

[51] Int. Cl.$^6$ .................................................. G06F 9/455
[52] U.S. Cl. .................. 395/500; 395/183.04; 395/527; 395/200.08; 364/DIG. 1; 364/228.1; 364/232.3; 364/DIG. 2; 364/927.81; 364/931.46
[58] Field of Search .......................... 395/500, 512, 395/183.04, 183.05, 527, 200.08, 200.09, 200.13, 200.14, 200.15, 200.16, 200.17, 200.18, 200.19, 200.2, 474, 475; 364/200 MS File, 900 MS File

[56] References Cited

U.S. PATENT DOCUMENTS

| | | | |
|---|---|---|---|
| 4,527,237 | 7/1985 | Frieder et al. | 364/200 |
| 4,709,328 | 11/1987 | Anthony, Jr. et al. | 364/200 |
| 4,722,048 | 1/1988 | Hirsch et al. | 364/200 |
| 5,428,801 | 6/1995 | Murano et al. | 395/500 |
| 5,463,754 | 10/1995 | Beausoleil et al. | 395/200.08 |
| 5,515,525 | 5/1996 | Grynberg et al. | 395/500 |
| 5,530,844 | 6/1996 | Phillips et al. | 395/500 |
| 5,564,019 | 10/1996 | Beausoleil et al. | 395/200.08 |
| 5,572,711 | 11/1996 | Hirsch et al. | 395/500 |
| 5,630,164 | 5/1997 | Williams et al. | 395/800 |

OTHER PUBLICATIONS

Predictive Performance Assessment dated Jul. 1995, Edward Gershenson et al International Data Corporation.
"Software Primitives for Emulation of Multiprocessor Architectures", by A. Svensson, IEEE, System Sciences, 1990 Annual Hawaii Int'l. Conference, 1990, pp. 48–56.
"Simulating Shared Memory in Message Passing Model", by O. Aguilar et al., IEEE, Computers and Communications, 1991, Int'l. Phoenix Conference, May 1994, pp. 232–238.
"Traffic Patterns in a Scalable Multiprocessor through Transputter Emulation", by S. Raina et al., IEEE, System Sciences, 1992 Annual Hawaii Int'l. Conference, Jan. 1992, pp. 267–276.
"Parallel Evaluation of a Parallel Architecture by means of Calibrated Emulation", by H. Muller et al., IEEE, Parallel Processing, 1994 Symposium, Jun. 1994, pp. 260–267.
"A Class Hierarchy Emulating Virtual Shared Objects on Message–Passing Systems", by K. Trachos et al., IEEE, Euromicro Workshop on Parallel and Distributed Processing, 1995, pp. 174–181.
"Implementing the Data Diffusion Machine Using Crossbar Routers", by H. Muller et al., IEEE, Proceedings of IPPS '96, Parallel Processing, 1996 Symposium, pp. 152–158.

*Primary Examiner*—Kevin J. Teska
*Assistant Examiner*—Russell W. Frejd
*Attorney, Agent, or Firm*—Herbert Dubno

[57] ABSTRACT

Heterogeneous computer systems are computer systems with different storage architectures, computer systems with different central processing units (CPUs), computer systems with different disk organization methods, computer systems with different access methods, computer systems that use different controller interfaces etc. These systems share data so that every one of the said computer systems can access the data independently, not relying on services from the others. A single copy of the data is maintained, as opposed to replicated data that is used, in some cases to overcome the same needs. Every system has direct access to the shared data, through the use of emulators that enable applications on every system to use the desired interfaces to the data, disguised as the ordinary local interfaces. An example is the accessing an IBM mainframe's DB2 data base from a UNIX environment. A special case of the above example is accessing of an IBM mainframe's DB2 database through an Oracle-like interface in the UNIX environment. Another use could be a fast down load program that derives an Oracle fast load compatible file from DB2.

16 Claims, 6 Drawing Sheets

ND OF SHARING DATA IN A
HETEROGENEOUS COMPUTER SYSTEM

SPECIFICATION

FIELD OF THE INVENTION

The present invention relates to a method of sharing data between computer units of a heterogeneous computer system, i.e. between computers that use different central processing units (CPUs), different storage architectures, different controller interfaces and/or different access methods. The invention also relates to a heterogeneous computer system with shared data and, therefore, to the implementation of the method, especially implementation of a single database management system for different computer types or computer units.

BACKGROUND OF THE INVENTION

Computer systems or computer types utilize different storage architectures, different access methods and different controller interfaces so that they cannot access data from another computer system or type although such a capability is clearly needed and would be a significant advantage. In networking and even where two types of computers are set up to access a common storage, the differences in storage architecture, access methods or controller interfaces have prevented effective sharing of data or common use of the same copy of the data.

Efforts have been made to enable the sharing of disk space between different types of computers. However, this kind of capability only enhances disk utilization and availability and contributes little to the development of integrated applications that can reside on different computer types or can reside on one computer type for utilization by another computer type.

There are data management systems which effectively conceal the problem from the user by requiring both computer types to be involved when any one of the computer types accesses data dominated by the other. The ability to provide each of a number of computer types with direct access to shared data and to allow applications on any system to be run on another system is, therefore, highly desirable.

OBJECTS OF THE INVENTION

It is, therefore, the principal object of the present invention to provide an improved method of sharing data between computer types of a heterogeneous computer system whereby drawbacks of earlier systems are obviated.

Another object of the invention is to provide a heterogeneous computer system or architecture capable of sharing data so that practically any computer type can be involved in the heterogeneous system and can access data of the storage.

It is another object of the invention to provide a high level interface which conceals details of the location and the storage architecture of shared data from application programs to such a degree that each application program can treat the data as a local file or data base and thus allows sharing of the data without the complexities of earlier systems.

Still another object of this invention is to provide a heterogeneous computer system comprised of a plurality of computer types which enables each computer type to look at the shared data in a completely different way, for example, Sybase on one machine and DB2 on another machine sharing data from a common storage.

SUMMARY OF THE INVENTION

These objects and others which will become apparent hereinafter are attained, in accordance with the invention through the use of emulators that interface between the application program and the relevant controller interface through an application program interface (API) or in a transparent manner.

More particularly, the method of the invention of sharing data between a first computer system operating with one application running therein and having a first disk organization method DOM 1 and a second computer system operating with an application running therein and having a second disk organization method DOM 2 and sharing a mass storage through a mass storage controller communicating with the mass storage with a third disk organization method DOM 3, comprises the steps of:

(a) in an emulator in the second computer system translating data communicated from the application running therein into DOM 2 data compatible with the second disk organization method at an interface of the second computer system and reconstructing DOM 2 data received at the interface of the second computer system into data compatible with the application running in the second computer system;

(b) communicating DOM 2 data between the interface of the second computer system and the mass storage controller and, in an emulator of the mass storage controller, translating DOM 2 data received from the interface of the second computer system into DOM 3 data compatible with the mass storage at one interface of the mass storage controller and reconstructing DOM 3 data received at the one interface from the mass storage into DOM 2 data supplied to the interface of the second computer system;

(c) communicating DOM 3 data from the one interface to the mass storage and DOM 3 data from the mass storage to the one interface;

(d) communicating DOM 3 data from another interface of the mass storage controller to the mass storage and DOM 3 data from the mass storage to the other interface; and (e) in another emulator of the mass storage controller translating DOM 1 data, compatible with the first disk organization method and received from an interface of the first computer system in which the one application runs with the DOM 1 data, into DOM 3 data which is supplied to the other interface of the mass storage controller and reconstructing DOM 1 data from DOM 3 data received from the other interface into DOM 1 data which is fed to the interface of the first computer system.

Both in the case already described and in cases to be described, we have referred to interfaces with the understanding that any one of them can, in turn, be any number of physical interfaces, that the "one" or "other" interface can be the same interface or group of interfaces or can even alternate among a number of interfaces which is larger than two.

This also applies to the interfaces between the computers and the controller, where more than one interface can be provided in each instance.

In another aspect of the invention the method of sharing data between heterogeneous computer systems in which a first computer system operating with one application running therein and having a first disk organization method DOM 1 and a second computer system operating with an application running therein and having a second disk organization method DOM 2 and sharing a mass storage through a mass storage controller communicating with the mass storage with a third disk organization method DOM 3, comprises the steps of:

(a) in an emulator in one of the second computer system and the mass storage controller translating data communicated from the application running in the second computer system from DOM 2 data compatible with the second disk organization method into DOM 3 data compatible with the mass storage and reconstructing DOM 3 data received from the mass storage into DOM 2 data for the application running in the second computer system;

(b) communicating DOM 3 data from one interface of the mass storage controller communicating with the emulator to the mass storage and DOM 3 data from the mass storage to the one interface;

(c) communicating DOM 3 data from another interface of the mass storage controller to the mass storage and DOM 3 data from the mass storage to the other interface; and (d) in another emulator in the mass storage controller translating DOM 1 data, compatible with the first disk organization method and received from an interface of the first computer system in which the one application runs with the DOM 1 data, into DOM 3 data which is supplied to the other interface of the mass storage controller and reconstructing DOM 1 data from DOM 3 data received from the other interface into DOM 1 data which is fed to the interface of the first computer system.

Of course more than one application can be running at any time in any of the computer systems and any number of applications can use the shared mass storage. Furthermore, while the description has been directed to cases involving two computer systems sharing a mass storage, the invention is applicable to sharing by any number of computer systems. Also, in the cases described, DOM 1, DOM 2 and DOM 3 need not necessarily be different. Rather any two or even all of them may be equal.

In the description of the invention the following abbreviations are used with the meanings indicated:

SCSI Small Computer System Interface
FBA Fixed Block Architecture
CKD Count Key and Data
API Application Program Interface
CPU Central Processing Unit
DBMS Data Base Management System
ESCON Enterprise Systems Connection
CI Controller Interface
DOM Disk Organization Method The following definitions are applicable:

Definitions

Controller

The term controller is used in this document in its most general sense, to represent the whole combination of hardware and software elements that connect the disk drive to the computer system. Such a combination may include an adapter, a telecommunication line, connecting cables, an intermediate computer, an "ordinary" control unit etc. Such a controller supports as a minimum, the connection of one disk drive to one computer system, but it may also support the connection of several disk drives to one computer system, several computer systems to one disk drive, several computer systems to several disk drives, several computer systems to several controllers or several controllers to one or several disk drives.

Access Method

This term is also used in its most general meaning and describes the way the data requests are specified to and executed by the operating system; it is meant to describe the whole range from channel programs to high level data base access requests (like SQL) and their processing.

Storage Types

Main Storage

Volatile storage that resides in the computer system running the application program. It's the most accessible and the most expensive kind of storage.

Cache

Volatile storage that resides in the computer system running the application or in the controller. Accessing it takes longer than accessing the main storage, but not as much as accessing the secondary storage.

Secondary Storage/Mass Storage

Direct Access Storage that resides on an external device (like a disk). It's not volatile and accessing it may take much longer than accessing any other type of storage.

Controller Interface

The protocol used for the communication between the controller and its environment (computers and mass storage).

Physical Interface

The equipment used to connect a computer to a controller or a controller to a device.

Disk Organization Method

The way data is organized on the disk.

Examples are FBA (Fixed Block Architecture) and CKD (Count, Key and Data).

Sharing Data

Data can be shared in several ways, not all of which are necessarily supported in every case, the level of support depending upon the degree of implementation of the heterogeneous locking mechanism.

One writer, many readers

One computer system, at most, is writing the data, the others are only allowed to read it.

One type writer, many readers

All the computer systems that are allowed to write are of the same type, computer systems of other types are only allowed to read.

Several heterogeneous readers and writers

Several computer systems of several types are allowed to read and to write.

In any case, accessing the data requires the ability to find its location on the secondary storage device, read the data from that location and translate it to its local representation.

While we have used here the term "heterogeneous computer system" to refer to a system which consists of two or more computer types (each of which may have multiple machines networked together—possibly by being connected to a set of common controllers—or a single machine and each of which can be referred to as a computer system), and a common data storage facility, it will be understood that each of the machines and each of the computer types or computer systems forming part of the heterogeneous computer system may have a local storage or memory as well.

The improved heterogeneous computer system or architecture with data sharing of the invention, therefore, can comprise:

a first computer system operating with one application running therein and having a first disk organization method DOM 1 and a first interface;

a second computer system operating with an application running therein and having a second disk organization method DOM 2, and a second interface;

a mass storage shared with the first and second computer systems;

a mass storage controller communicating with the mass storage and connected to the first and second interfaces and having a third disk organization method DOM 3;

an emulator in the second computer system translating data communicated from the application running therein into DOM 2 data compatible with the second disk organization method at the second interface and reconstructing DOM 2 data received at the second interface compatible with the application running in the second computer system;

means for communicating DOM 2 data between the second interface and the mass storage controller;

a first emulator of the mass storage controller translating DOM 2 data received from the second interface into DOM 3 data compatible with the mass storage at a third interface of the mass storage controller and reconstructing DOM 3 data received at the third interface from the mass storage into DOM 2 data supplied to the second interface;

means for communicating DOM 3 data from the third interface to the mass storage and DOM 3 data from the mass storage to the third interface;

means for communicating DOM 3 data from a fourth interface of the mass storage controller to the mass storage and DOM 3 data from the mass storage to the fourth interface; and in a second emulator of the mass storage controller translating DOM 1 data, compatible with the first disk organization method and received from the first interface in which the one application runs with the DOM 1 data, into DOM 3 data which is supplied to the fourth interface and reconstructing DOM 1 data from DOM 3 data received from the fourth interface into DOM 1 data which is fed to the first interface of the first computer system.

One of the computer types or systems can be a mainframe computer system while the other computer types or system can utilize one or more UNIX machines while the mass storage can be operated as a database storage.

According to a feature of the invention, data locking operational from at least one of the computer systems can be applied in the mass storage. If desired, only one of the computer systems may be enabled to write shared data into the mass storage or only one type of computer or a single machine may be enabled to write shared data into the system.

The mass storage can have or can be a shared cache memory and the mass storage control unit can have a shared locking program.

Uses of the invention can include: accessing an IBM mainframe DB2 database from a UNIX environment or a fast download program that runs in the UNIX environment and derives an Oracle fast load compatible file from DB2 on the mainframe.

BRIEF DESCRIPTION OF THE DRAWING

The above and other objects, features, and advantages will become more readily apparent from the following description, reference being made to the accompanying drawing in which.

SPECIFIC DESCRIPTION

In the description below, the relationship between two different computer types and the shared data storage utilizing the existing controller interfaces will be detailed generically with respect to FIG. 1 and by way of example of how the generic system can be specifically applied with respect to FIGS. 2 to 5. FIG. 6 showing an algorithm. Basically in FIG. 1, two computer systems 10 and 20 with respective applications share a secondary storage system represented generically at 30. As can be seen from FIG. 2, one computer type 10 may involve a UNIX machine or a network of UNIX machines while the other computer type 20 may represent an IBM Mainframe. The mass storage 30 may be a storage unit of the Symmetrix type manufactured by EMC.

Figure 2:
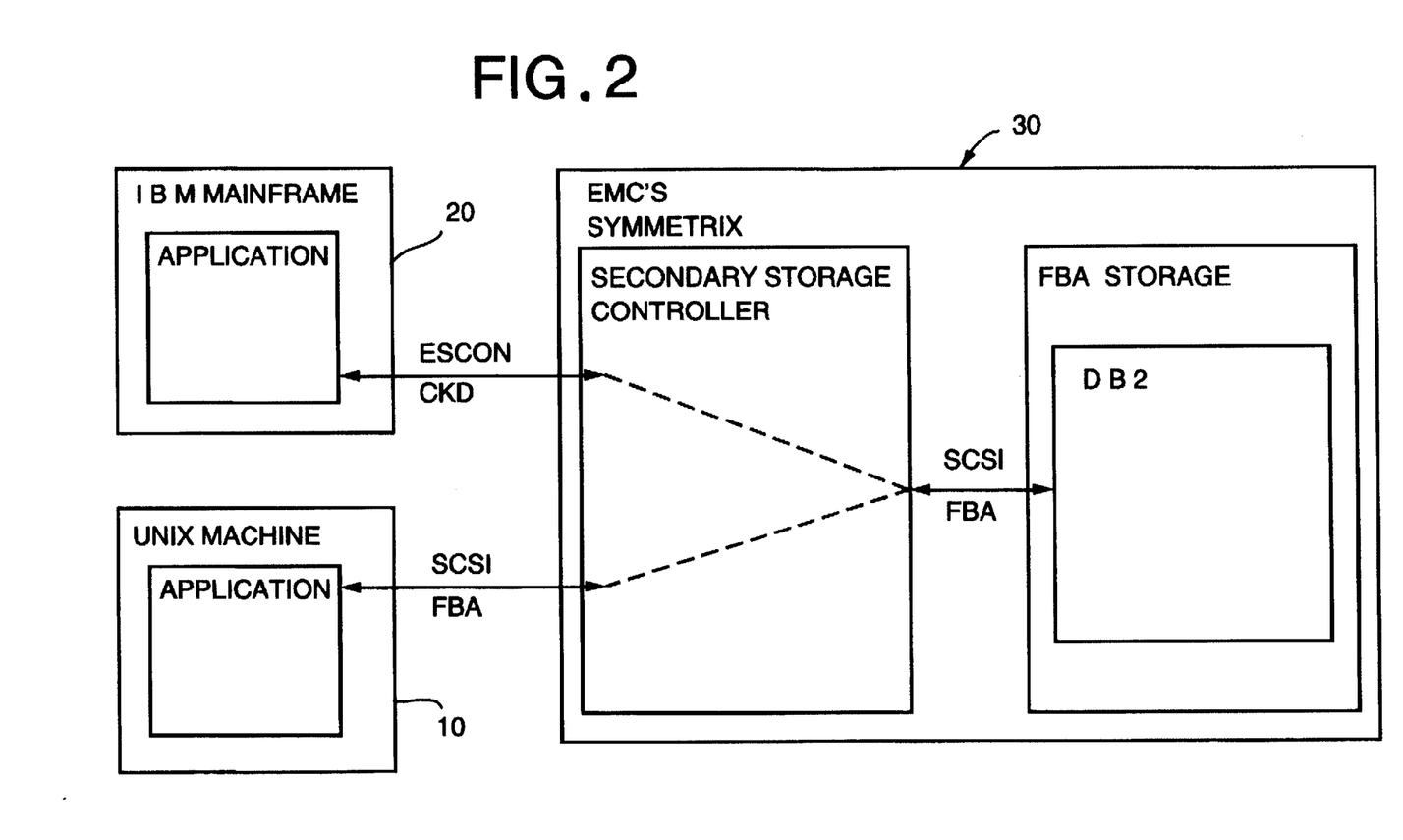
FIG. 2 is a block diagram of one specific example of such a system.

In the embodiment of FIG. 2, therefore, a specific situation is shown where DB2 data is shared between the IBM Mainframe and the UNIX environment. In the contrasting prior-art system of FIG. 3, the system utilizes the UNIX system 10 and the IBM Mainframe 20 in combination with the EMC Symmetrix 30 while a different relationship is established between the files or data bases in storage and the treatment thereof by the secondary storage controller and there is no data sharing.

Figure 4:
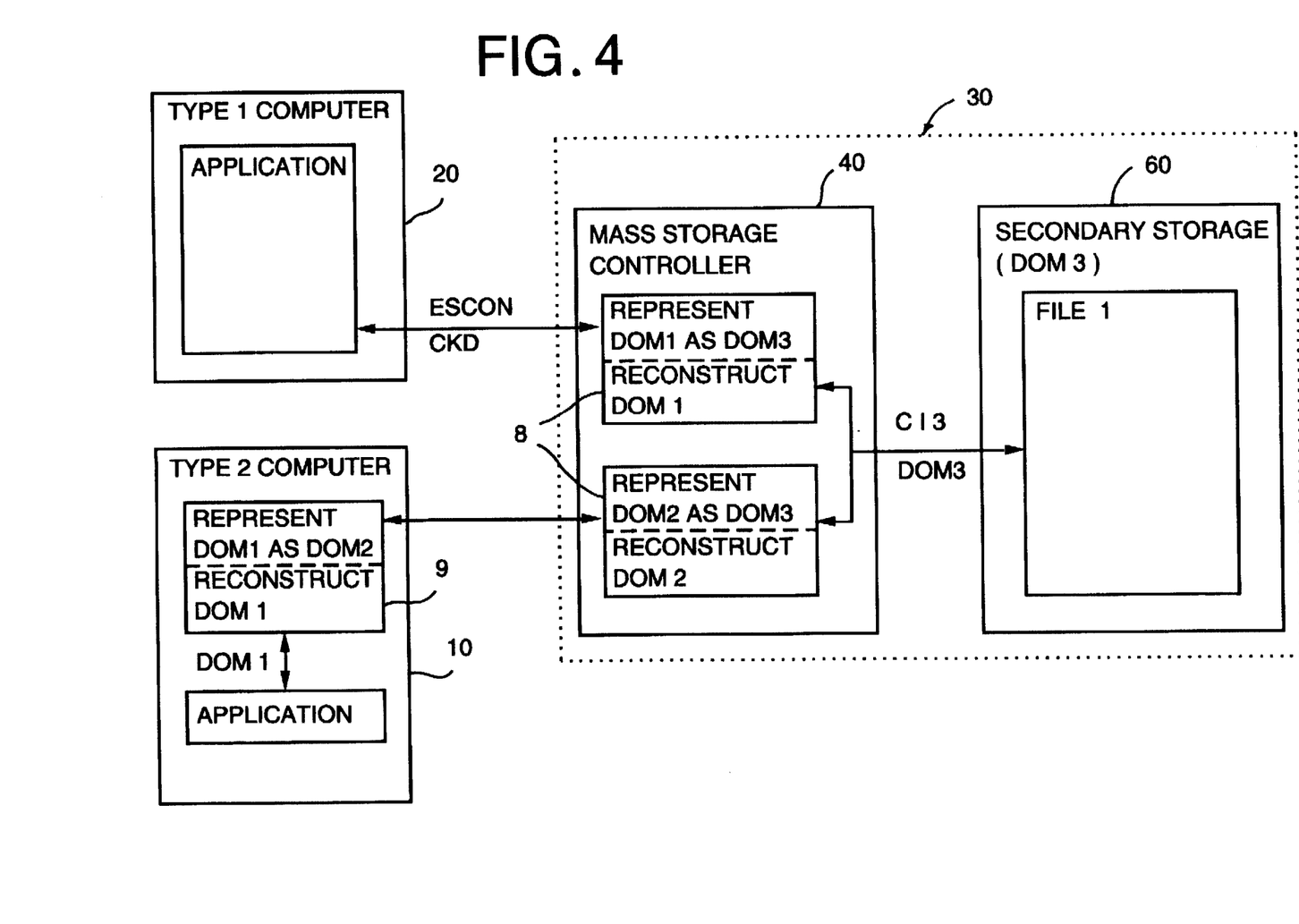
FIG. 4 is a block diagram of still another heterogeneous computer system sharing data between two different types of computers, each represented by one computer and wherein, as in FIG. 1, CI represents the controller interface and DOM represents the respective disk organization method.

FIG. 4 represents a general application of the system for two computer systems 10, 20 utilizing a mass storage 30 with a mass storage controller 40 and the secondary storage 60. While two types of computers have been shown for the mass storage 30, in practice any number of computer types may be used and any one of the computer types or systems can comprise any number of machines.

Figure 5:
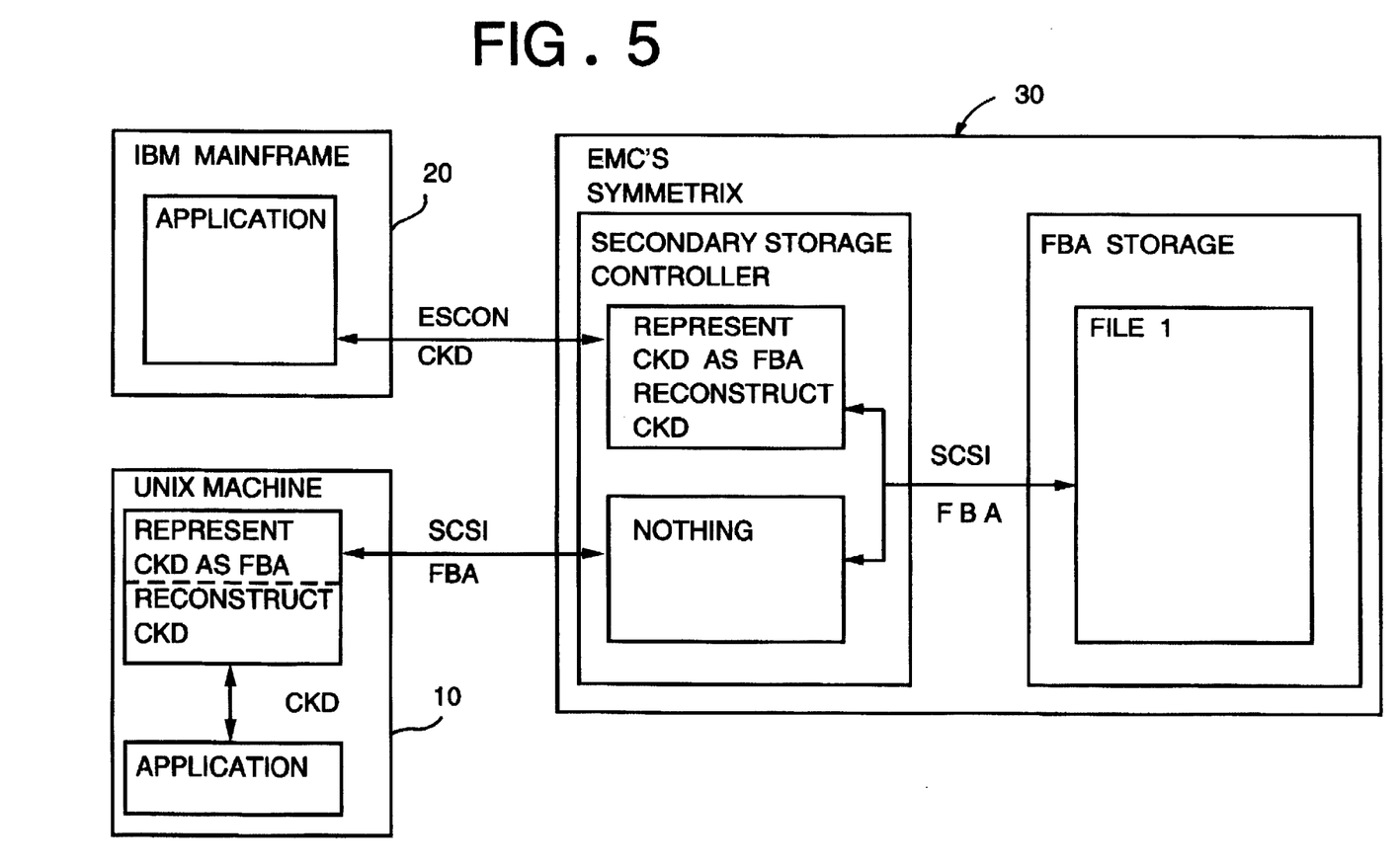
FIG. 5 is a block diagram of still a further heterogeneous computer system utilizing two different types of machines as an example of the generic structure of FIG. 1.
Figure 6:
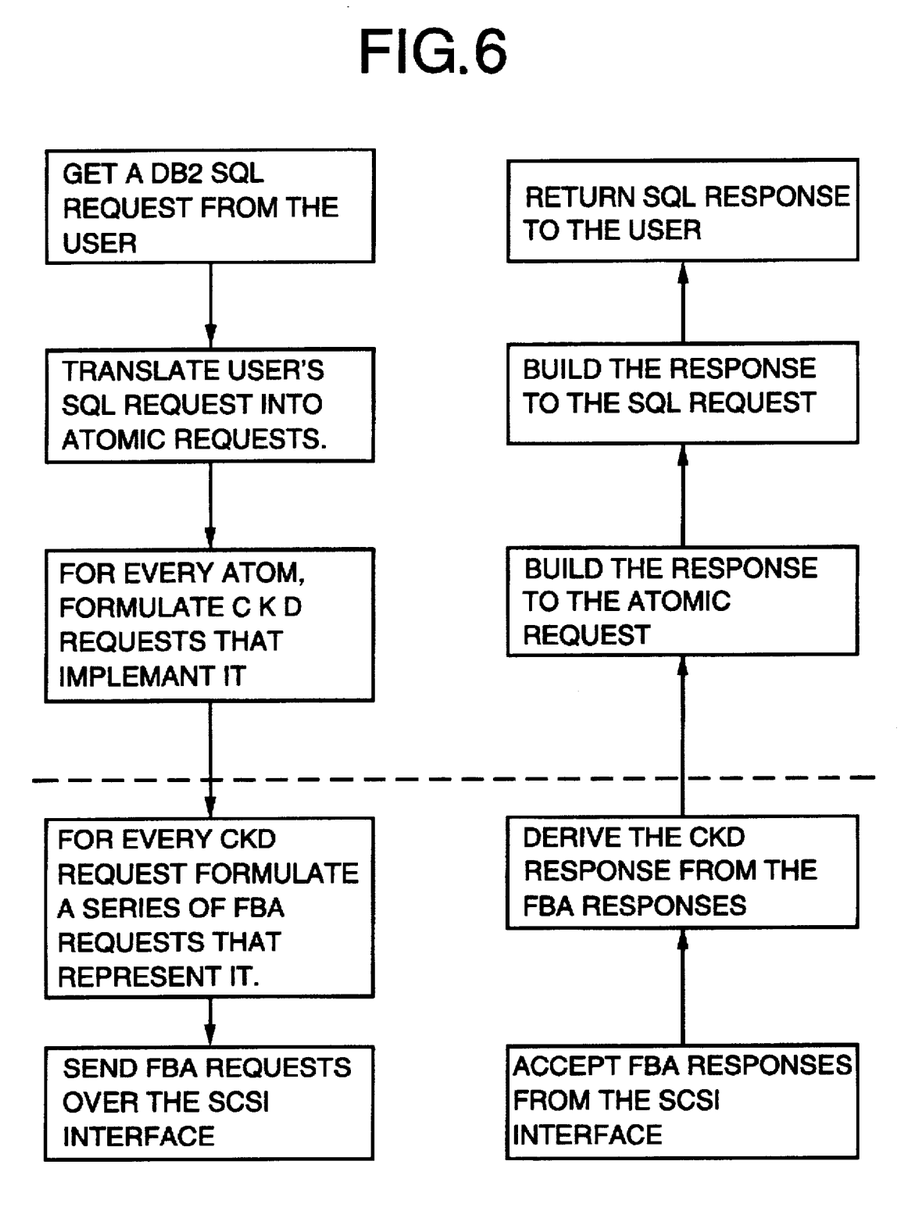
FIG. 6 is a diagram of an algorithm for use with the system of FIG. 5.

In the embodiment of FIG. 5 the UNIX machine 10 and the IBM Mainframe 20 are connected to the shared data system 30 but here a mechanism for translation has been added to the UNIX environment enabling UNIX applications to share data with the Mainframe applications.

FIG. 6 shows how an SQL request is handled in the system of FIG. 5 and this algorithm can describe the way every SQL request originating in any computer system is handled in the invention, any differences between the computer systems only influencing how the work is divided between the computer system and the controller.

Figure 1:
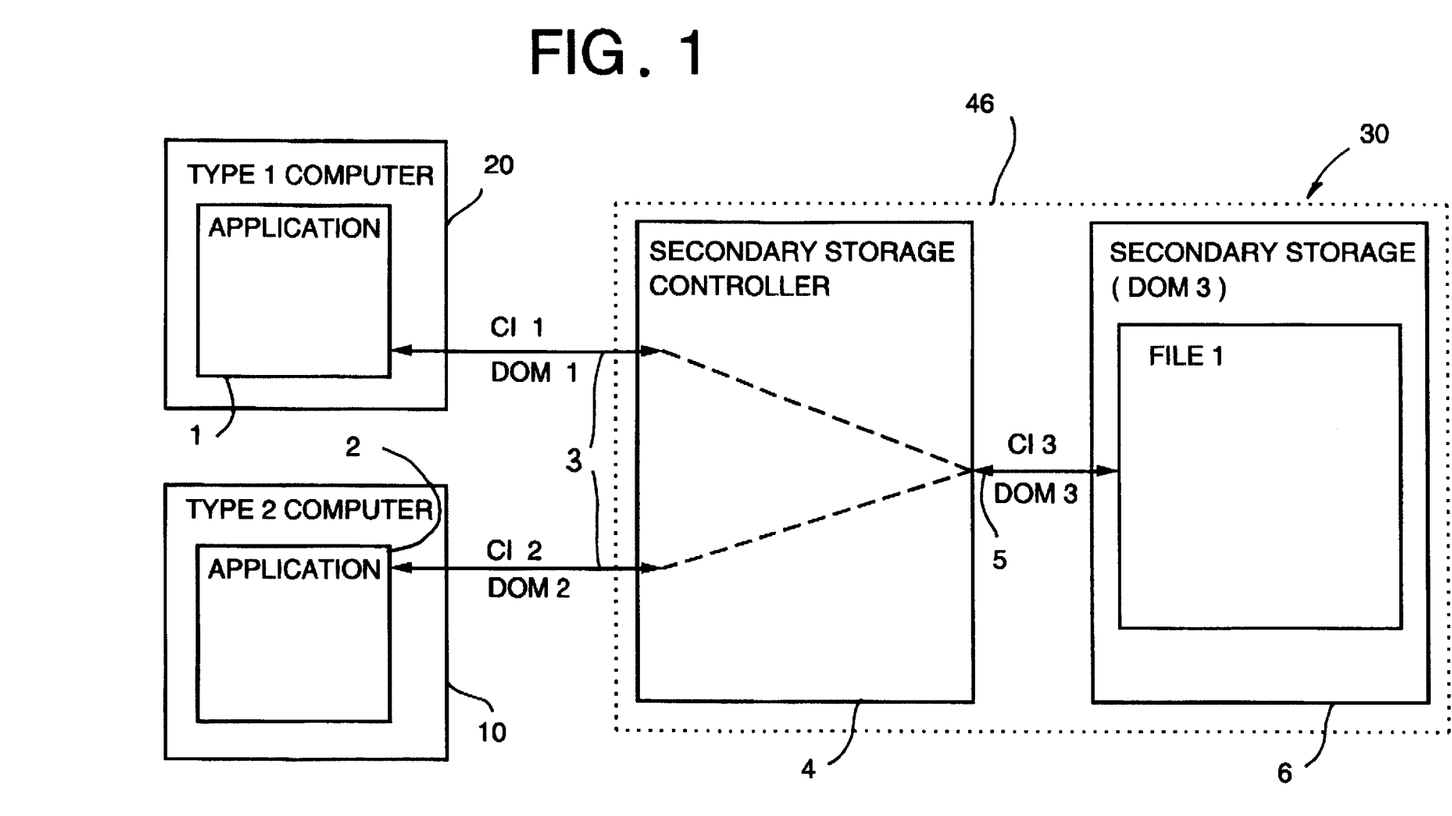
FIG. 1 is a block diagram illustrating a heterogeneous system with sharing of storage in accordance with the invention and representing a generic system.

FIG. 1 depicts a small environment for practicing the present invention. Two applications (1) residing on two different types of computer systems (2) that use different controller interfaces and different disk organization methods on their connections (3) to the controller (4) that connects to the secondary storage device (6) through still another controller interface and disk organization method (5). The controller (4) and the secondary storage device (6) are optionally packaged in the same box (46).

FIG. 2 describes a specific environment that conforms to the general description in FIG. 1. Here one of the computer systems is an IBM Mainframe and the other is a UNIX machine; applications running on both of these computer systems need to access DB2 data residing on a SCSI disk array managed by EMC's Symmetrix controller. The mainframe uses the ESCON interface to the controller and assumes a CKD organization of the disks; the UNIX machine uses SCSI interface and assumes that the disk is organized in FBA.

Figure 3:
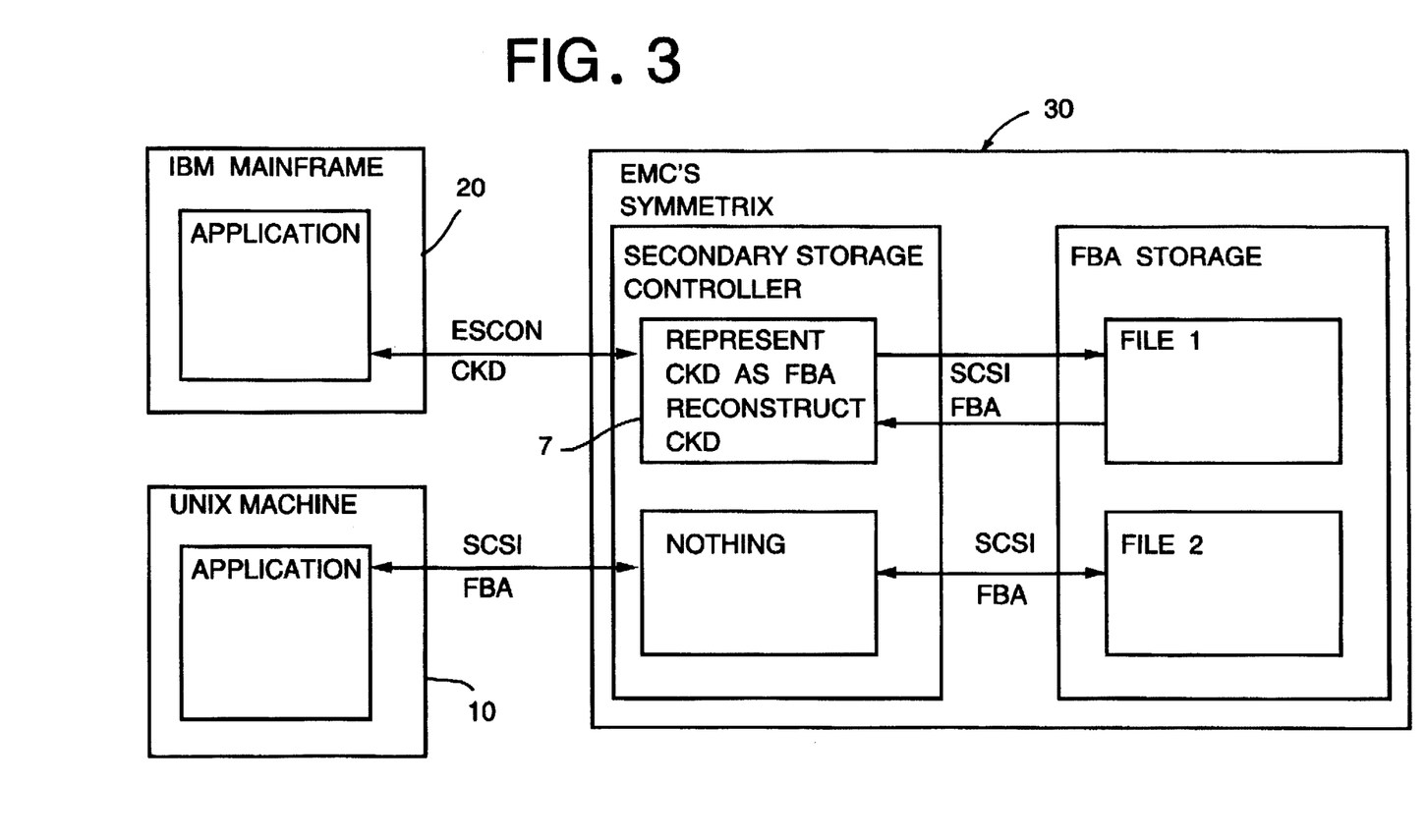
FIG. 3 is a block diagram of an example of the way space management is shared in existing hardware without achieving data sharing.

FIG. 3 describes how, in the previous example, a disk controller is shared using an emulator (7) that is embedded in the Symmetrix controller. CKD I/O requests coming from the mainframes application through the ESCON interface are translated by this emulator to FBA requests that implement a CKD representation on FBA, and sent to the disk drive through a SCSI interface; responses coming from the disk drive through the SCSI interface are used to create the implied CKD responses which are sent to the Mainframe's application through the ESCON interface.

This architecture does not provide data sharing since it contains no means for the UNIX system to deal with the CKD control data.

FIG. 4 shows how the generalization form shared storage management to shared data is achieved.

Computer systems of type 1 use CI 1 as a controller interface and DOM 1 as a disk organization method; this happens to be exactly what the application running on this computer expects and therefore, the first (and only) emulation that translates this data is the one residing in the controller, translating it between DOM 1 and DOM 3 which is the DOM used by the disk array.

Computer systems of type 2 use CI 2 and DOM 2 as their way to communicate with the data. Since this is not the way the specific application running in this computer system needs, an emulator (9) is used to translate the data between DOM 1 which is sent and received (10) by the application and DOM 2 which is used on the way to the controller. Emulators (8) are also used in the secondary storage controller in order to translate between the organization methods used on the computer side of the controller and the one that is used on its device side.

Data that is created in the type 2 computer system may be thus transformed by two emulators (identity emulators which do nothing are a special case). On their way out of the application the requests are first transformed from their DOM 1 representation, to a DOM 2 representation that is attributed the same semantics; next this representation is further replaced by a DOM 3 representation.

On its way back to the application, first the DOM 2 representation is recreated from the device's reply and then this representation is used to recreate the DOM 1 representation that is needed by the application.

The generalization to the general case of an arbitrary number of computer systems is straight forward.

FIG. 5 is an example of the principles that are described in FIG. 4.

FIG. 6 illustrates the general flow of control and data, associated with a single SQL request in the system described in FIG. 5.

The flow described in this FIGURE is relevant for both the mainframe and the UNIX machine.

When the SQL request originated in the Mainframe

The DB2 DBMS (above the dashed line) translates the SQL request into a series of CKD requests.

The CKD requests are transmitted to the Symmetrix machine (below the dashed line).

The Symmetrix machine translates these requests into equivalent FBA requests and communicates them to its embedded SCSI disks.

Since DB2 uses fixed block sizes, the translation of its I/O requests from CKD to FBA is straight forward; in more complicated situations, where variable block sizes are used, the Symmetrix machine uses a table it maintains internally in order to connect a key of the CKD to its byte address on the FBA device.

Responses to the mainframe's requests, coming from the disk, are used by the emulator running in the Symmetrix to build the appropriate CKD formulation needed by the mainframe.

The same internal tables are used again, when needed, and the reply is sent to the mainframe over the ESCON connection.

When the SQL request originated in the UNIX machine

The same technique is used, only this time a general SQL driver (like Dharma/SQL Access or Sapiens/LDB or IBM/DataJoiner or Informix/Enterprise Gateway or MDI/OmniSQL) is used to break the SQL request into atoms that are supported by the emulator.

The emulator (on the UNIX machine) translates these atoms into CKD requests and then transforms these CKD requests into a series of FBA requests.

These FBA requests, when transmitted over the SCSI interface of the UNIX machine to the Symmetrix, can be used by it to create the appropriate FBA requests to be addressed to its internal disks.

Again, in the case of DB2, the translation of CKD to FBA is straight forward and no further translation is needed in the Symmetrix machine.

In more complicated cases, the SCSI/FBA requests are only used to carry the meaning of the request to the Symmetrix which then uses its internal tables to build the final FBA requests.

Responses to the requests of the UNIX machine are handled when appropriate, by the emulator running on the Symmetrix which uses its internal tables in order to create the FBA response to be sent to the UNIX machine.

Again, in the case of DB2, no use of these tables is needed and the FBA responses created by the internal disk of the Symmetrix can be directly transmitted to the UNIX machine. In the UNIX machine, these responses are translated to CKD.

Buffering is initially implemented in the controller level, maintaining buffers in a higher level will jeopardize the independence of the computer systems unless a shared locking mechanism is in place.

The shared locking mechanism's preferred embodiment is the one described in U.S. Pat. No. 5,339,427 although different mechanisms could also be used. Where desired data encryption and data compression can be used in any data-flow direction.

Furthermore, while DB2 has been mentioned as a data base which is shared in the embodiments described above, other data bases or data collection forms can be used as well. These include IMS, ADABAS and VSAM.

Where required translation between the mode of representation of the shared data may be necessary and is carried out, e.g. translation from EBCDIC into ASCII or vice versa. When reference is made herein to shared data and the shared data is a data base, it will be understood that systems which can join data collections can be utilized as well, e.g. in the formation of a single relational data base from a multiplicity of tables or the like.

We claim:

1. A method of sharing data between a first computer system operating with at least one application running therein and having a first disk organization method DOM 1 and a second computer system operating with at least one application running therein and having a second disk organization method DOM 2 and sharing a mass storage through a mass storage controller communicating with the mass storage with a third disk organization method DOM 3, said method of sharing data comprising the steps of:

(a) in an emulator in said second computer system, translating data communicated from an application running therein into DOM 2 data compatible with said second disk organization method at an interface of said second computer system and reconstructing DOM 2 data received at said interface of said second computer system into data compatible with said application running in said second computer system;

(b) communicating DOM 2 data between said interface of said second computer system and said mass storage controller and, in an emulator of said mass storage controller, translating DOM 2 data received from said interface of said second computer system into DOM 3 data compatible with said mass storage at one interface of said mass storage controller and reconstructing DOM 3 data received at said one interface from said mass storage into DOM 2 data supplied to said interface of said second computer system;

(c) communicating DOM 3 data from said one interface to said mass storage and DOM 3 data from said mass storage to said one interface;

(d) communicating DOM 3 data from another interface of said mass storage controller to said mass storage and DOM 3 data from said mass storage to said other interface; and (e) in another emulator of said mass storage controller, translating DOM 1 data, compatible with said first disk organization method and received from an interface of said first computer system in which said one application runs with said DOM 1 data, into DOM 3 data which is supplied to said other interface of said mass storage controller and reconstructing DOM 1 data from DOM 3 data received from said other interface into DOM 1 data which is fed to said interface of said first computer system.

2. A method of sharing data between heterogeneous computer systems in which a first computer system operating with at least one application running therein and having a first disk organization method DOM 1 and a second computer system operating with at least one application running therein and having a second disk organization method DOM 2 and sharing a mass storage through a mass storage controller communicating with the mass storage with a third disk organization method DOM 3, said method of sharing data comprising the steps of:

(a) in an emulator in one of said second computer system and said mass storage controller, translating data communicated from an application running in said second computer system from DOM 2 data compatible with said second disk organization method into DOM 3 data compatible with said mass storage and reconstructing DOM 3 data received from said mass storage into DOM 2 data for said application running in said second computer system;

(b) communicating DOM 3 data from one interface of said mass storage controller communicating with said emulator to said mass storage and DOM 3 data from said mass storage to said one interface;

(c) communicating DOM 3 data from another interface of said mass storage controller to said mass storage and DOM 3 data from said mass storage to said other interface; and (d) in another emulator in said mass storage controller translating DOM 1 data, compatible with said first disk organization method and received from an interface of said first computer system in which said one application runs with said DOM 1 data, into DOM 3 data which is supplied to said other interface of said mass storage controller and reconstructing DOM 1 data from DOM 3 data received from said other interface into DOM 1 data which is fed to said interface of said first computer system.

3. The method defined in claim 1 or claim 2 wherein said one of said computer systems is a mainframe computer system and the other of said computer systems is a Unix machine.

4. The method defined in claim 1 or claim 2 wherein said shared data is a data base.

5. The method defined in claim 1 or claim 2 wherein said one of said computer systems is a UNIX machine and the other of said computer systems is another UNIX machine.

6. The method defined in claim 1 or claim 2, further comprising providing data locking operable from at least one of said computer systems in said mass storage.

7. The method defined in claim 1 or claim 2, further comprising the step of enabling only one of said computer systems to write shared data into said mass storage.

8. The method defined in claim 1 or claim 2, further comprising enabling only computers of one type to write shared data into said mass storage.

9. A heterogeneous computer architecture with data sharing comprising:

a first computer system operating with at least one application running therein and having a first disk organization method DOM 1 and a first interface;

a second computer system operating with at least one application running therein and having a second disk organization method DOM 2, and a second interface;

a mass storage shared with said first and second computer systems;

a mass storage controller communicating with the mass storage and connected to said first and second interfaces and supporting a third disk organization method DOM 3 used by the secondary storage;

an emulator in said second computer system translating data communicated from an application running therein into DOM 2 data compatible with said second disk organization method at said second interface and reconstructing DOM 2 data received at said second interface compatible with said application running in said second computer system;

means for communicating DOM 2 data between said second interface and said mass storage controller;

a first emulator of said mass storage controller translating DOM 2 data received from said second interface into DOM 3 data compatible with said mass storage at a third interface of said mass storage controller and reconstructing DOM 3 data received at said third interface from said mass storage into DOM 2 data supplied to said second interface;

means for communicating DOM 3 data from said third interface to said mass storage and DOM 3 data from said mass storage to said third interface;

means for communicating DOM 3 data from a fourth interface of said mass storage controller to said mass storage and DOM 3 data from said mass storage to said fourth interface; and in a second emulator of said mass storage controller translating DOM 1 data, compatible with said first disk organization method and received from said first interface in which said one application runs with said DOM 1 data, into DOM 3 data which is supplied to said fourth interface and reconstructing DOM 1 data from DOM 3 data received from said fourth interface into DOM 1 data which is fed to said first interface of said first computer system.

10. The architecture of claim 7 wherein said mass storage has a shared cache memory.

11. The architecture defined in claim 7 wherein said mass storage controller has a shared locking program.

12. The architecture defined in claim 7 wherein the data shared by said computer systems is a data base.

13. The architecture defined in claim 12 wherein said data base is DB2.

14. The architecture defined in claim 12 wherein said data base is IMS.

15. The architecture defined in claim 12 wherein said data base is ADABAS.

16. The architecture defined in claim 12 wherein said data base is VSAM.

* * * * *